United States Patent [19]

Dick

[11] Patent Number: 4,620,711

[45] Date of Patent: Nov. 4, 1986

[54] MULTI-FUNCTION CHILD CARRIER

[76] Inventor: Timber Dick, 4320 Zenobia St., Denver, Colo. 80212

[21] Appl. No.: 636,845

[22] Filed: Aug. 1, 1984

[51] Int. Cl.[4] ............................................... B62B 7/08
[52] U.S. Cl. ...................... 280/30; 224/42.01; 224/153; 224/155; 224/161; 280/38; 280/39; 280/643; 297/130; 297/254
[58] Field of Search ............... 280/30, 31, 38, 39, 280/42, 47.24, 47.25, 47.37 R, 47.38, 642, 643, 646, 647, 648, 644; 297/254, 183, 130, 253, 254, 255, 250, 377; 224/153, 155, 158, 159

[56] References Cited

U.S. PATENT DOCUMENTS

| | | | |
|---|---|---|---|
| Re. 30,867 | 2/1982 | Gaffney | 280/642 |
| 2,291,640 | 8/1942 | Lee | 297/255 |
| 2,435,733 | 2/1948 | Belyeu | 280/30 |
| 2,508,905 | 5/1950 | Cohen | 280/30 |
| 2,509,103 | 5/1950 | Lewis et al. | 280/39 |
| 2,720,911 | 10/1955 | Lantz | 280/30 |
| 2,803,468 | 8/1957 | Thompson | 280/30 |
| 2,805,076 | 9/1957 | Thomas | 280/643 |
| 2,864,429 | 12/1958 | Combs | 297/184 |
| 3,563,601 | 2/1971 | Bickey | 297/466 |
| 3,836,164 | 9/1974 | Sugino et al. | 280/642 |
| 3,961,803 | 6/1976 | Fleischer | 280/642 |
| 3,984,115 | 10/1976 | Miller | 280/30 |
| 4,113,306 | 9/1978 | von Wimmersperg | 297/250 X |
| 4,157,837 | 6/1979 | Kao | 280/30 |
| 4,266,807 | 5/1981 | Griffin | 280/644 X |

*Primary Examiner*—John J. Love
*Assistant Examiner*—Mitchell J. Hill
*Attorney, Agent, or Firm*—John E. Reilly

[57] ABSTRACT

A child carrier comprised of a seat-mounting frame and a lower wheel frame assembly depending downwardly from the mounting frame, the wheel frame assembly including front and rear wheels supported for downward extension from the wheel frame assembly, and a seat portion disposed on the seat mounting frame. A handle has side frame portions extending from opposite sides of the seat-mounting frame terminating in a hand-engaging, angled end extending rearwardly from the side frames with the handle member pivoted to the seat mounting frame for pivotal movement of the handle about a horizontal axis from a first position in which the handle extends rearwardly from the seat mounting frame when used as a stroller to a position in which the handle is directed downwardly from its pivotal connection to the seat mounting frame such that the angled end thereof is disposed beneath the wheels in order to support the carrier on a car seat when used as a car seat carrier.

20 Claims, 12 Drawing Figures

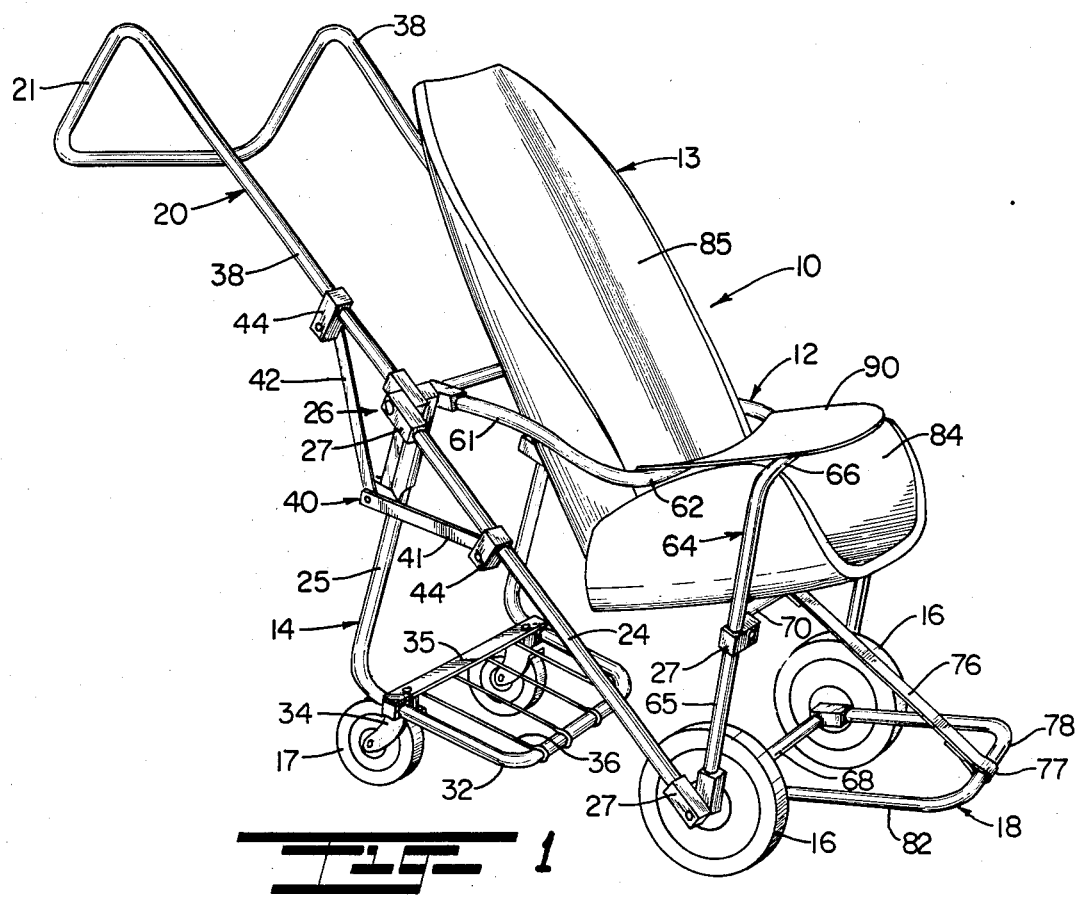
_Fig. 1_
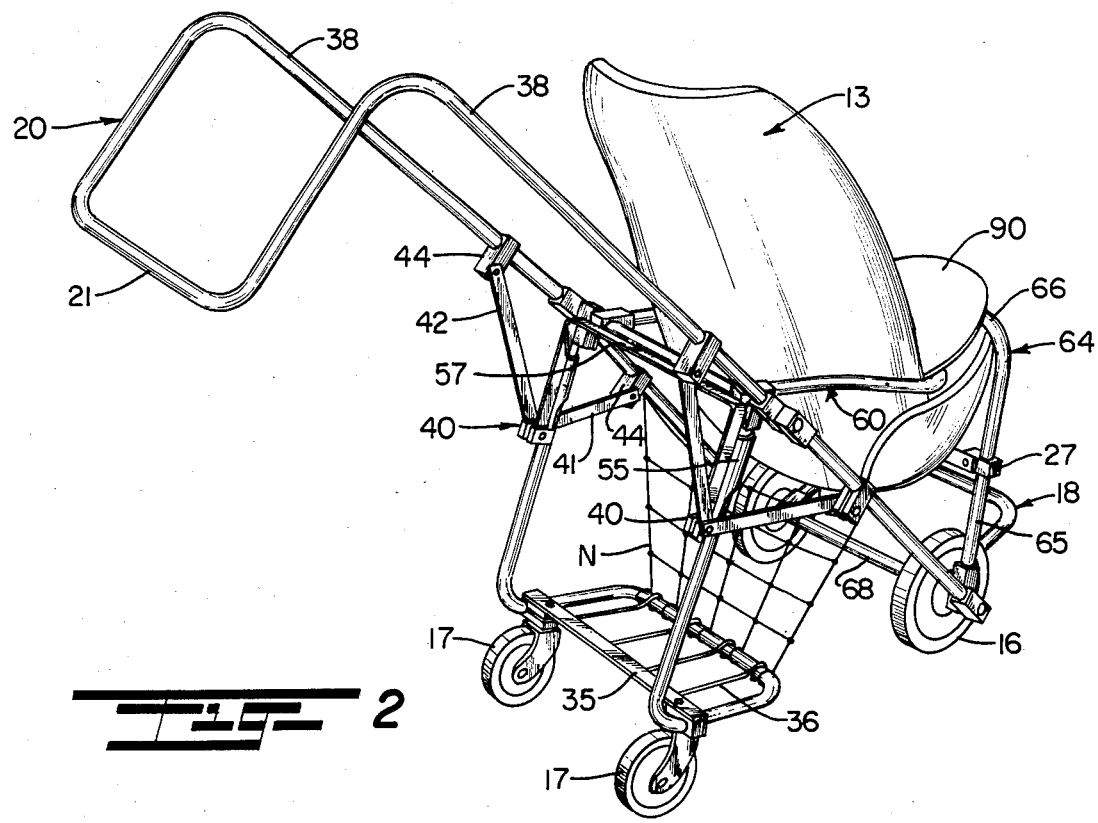
_Fig. 2_

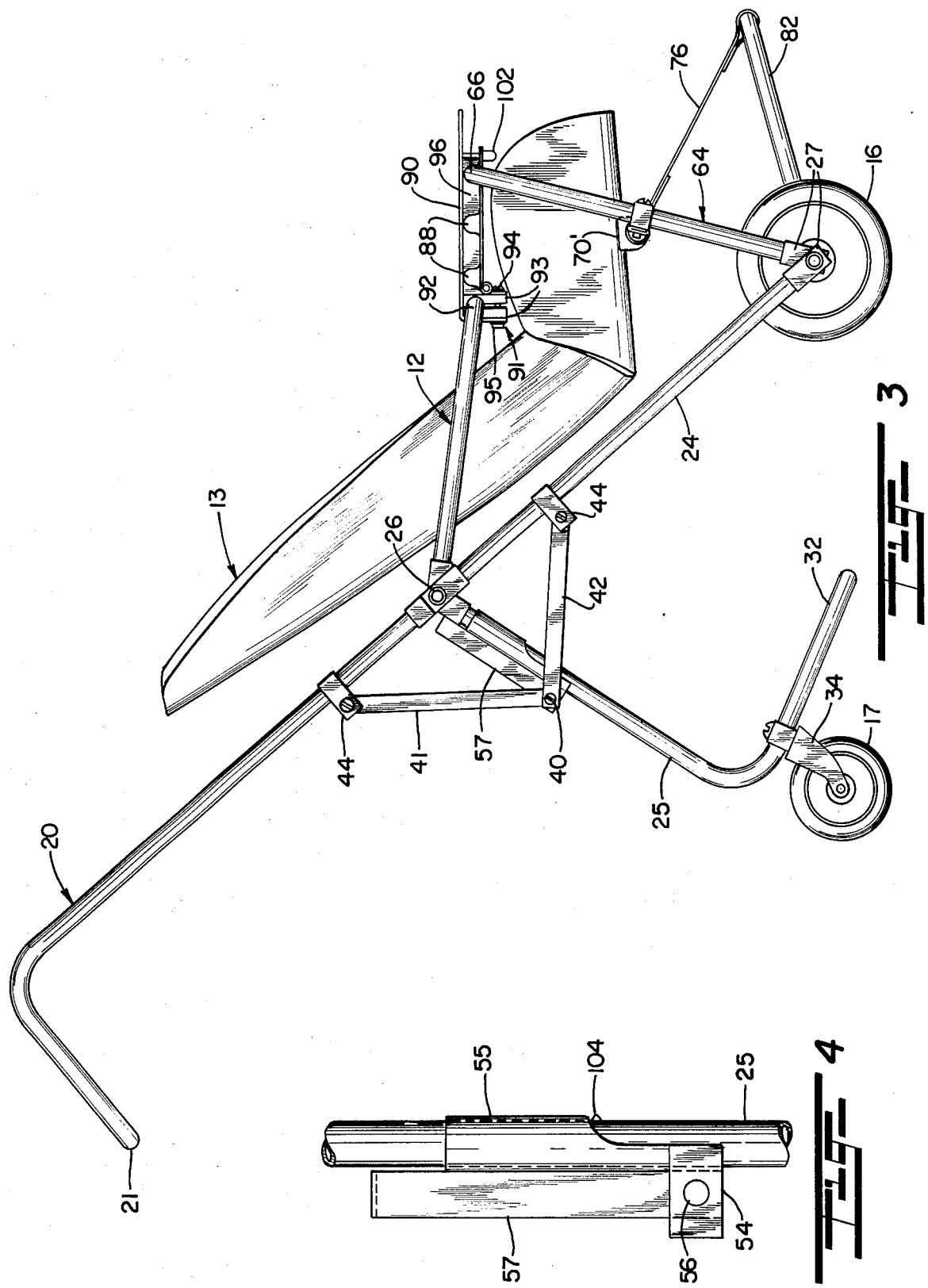

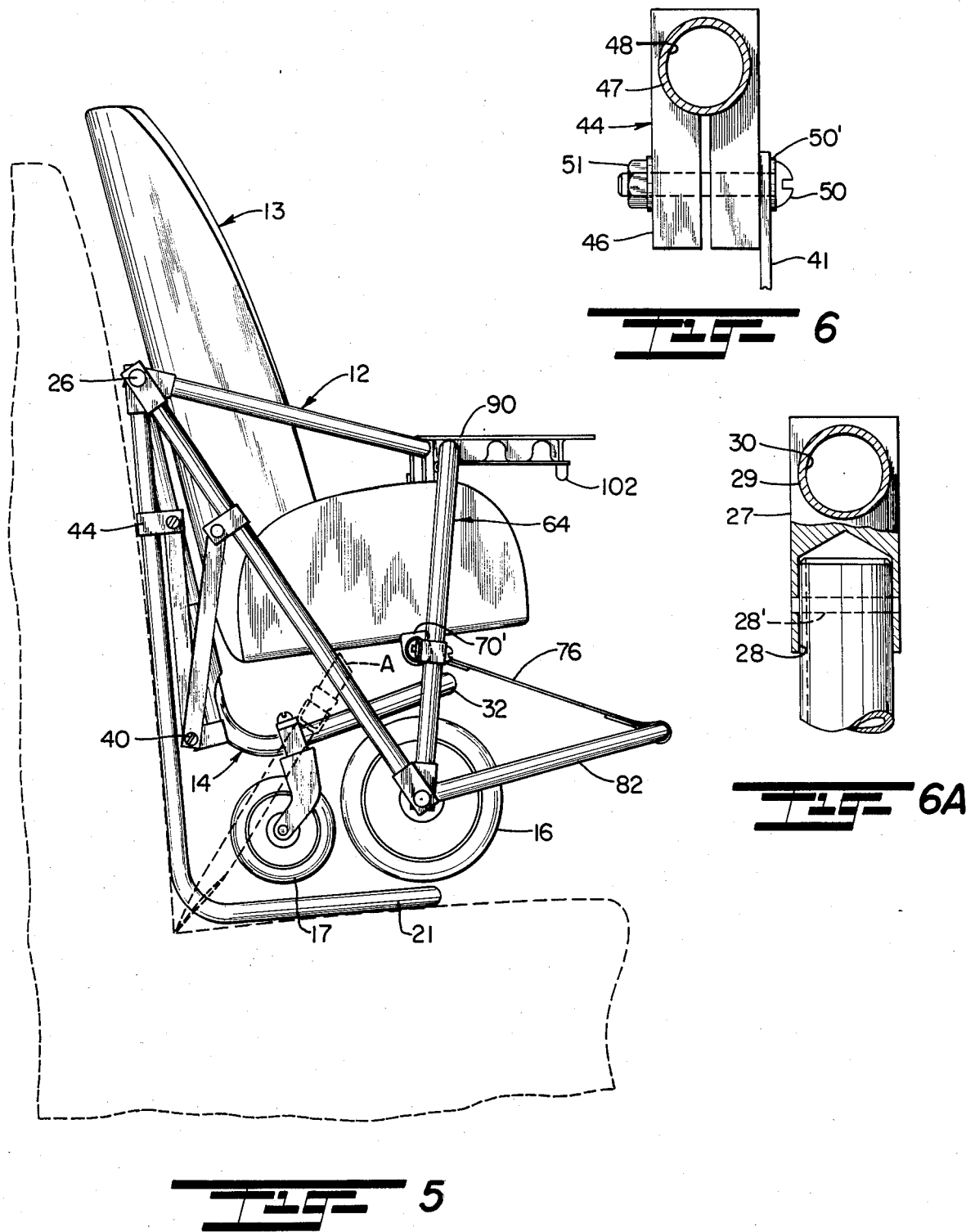

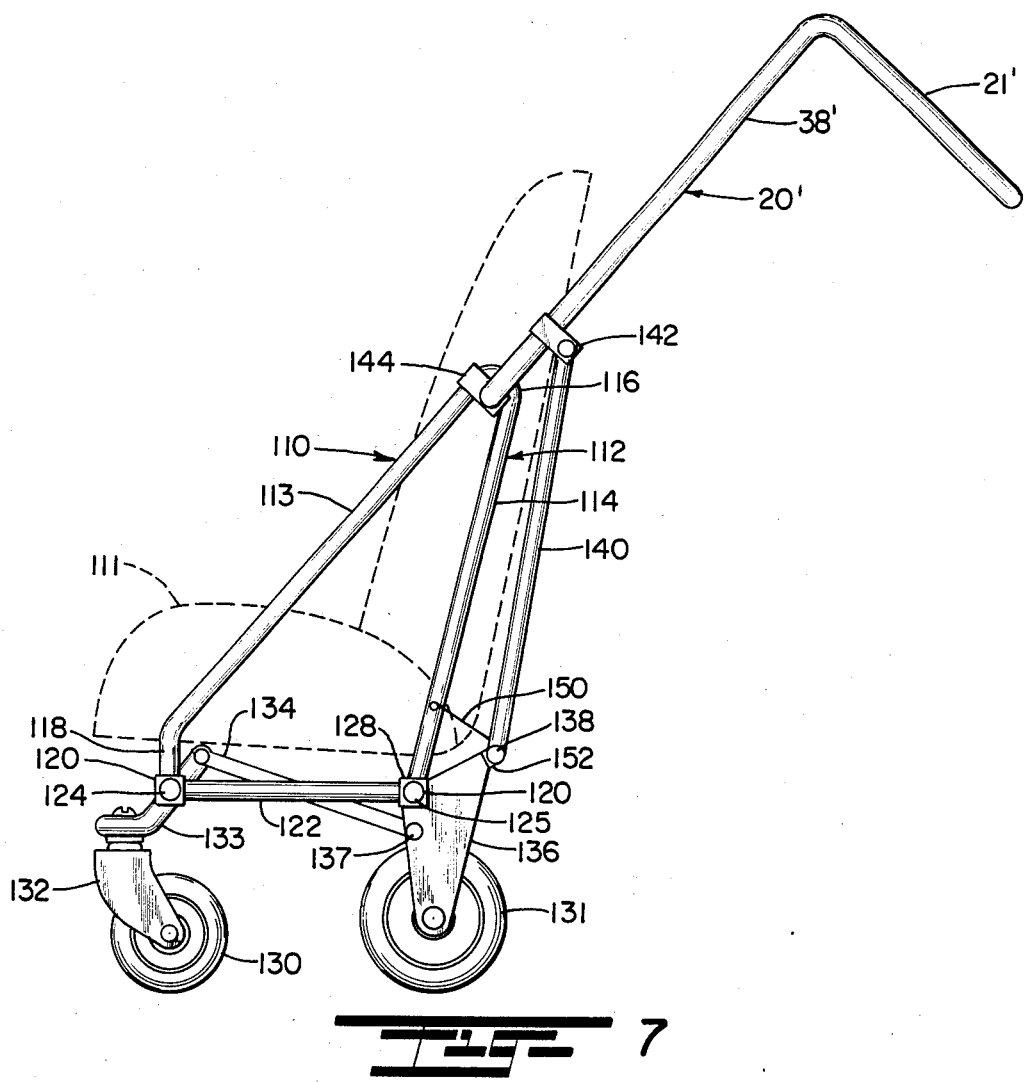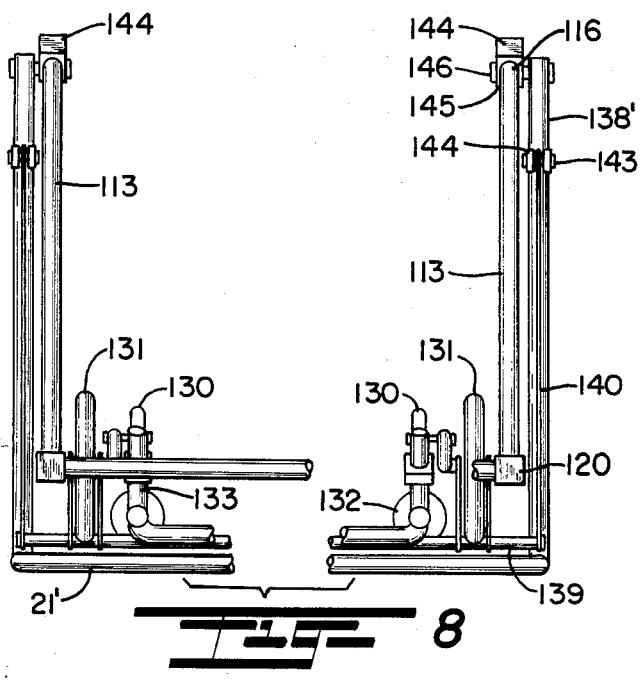

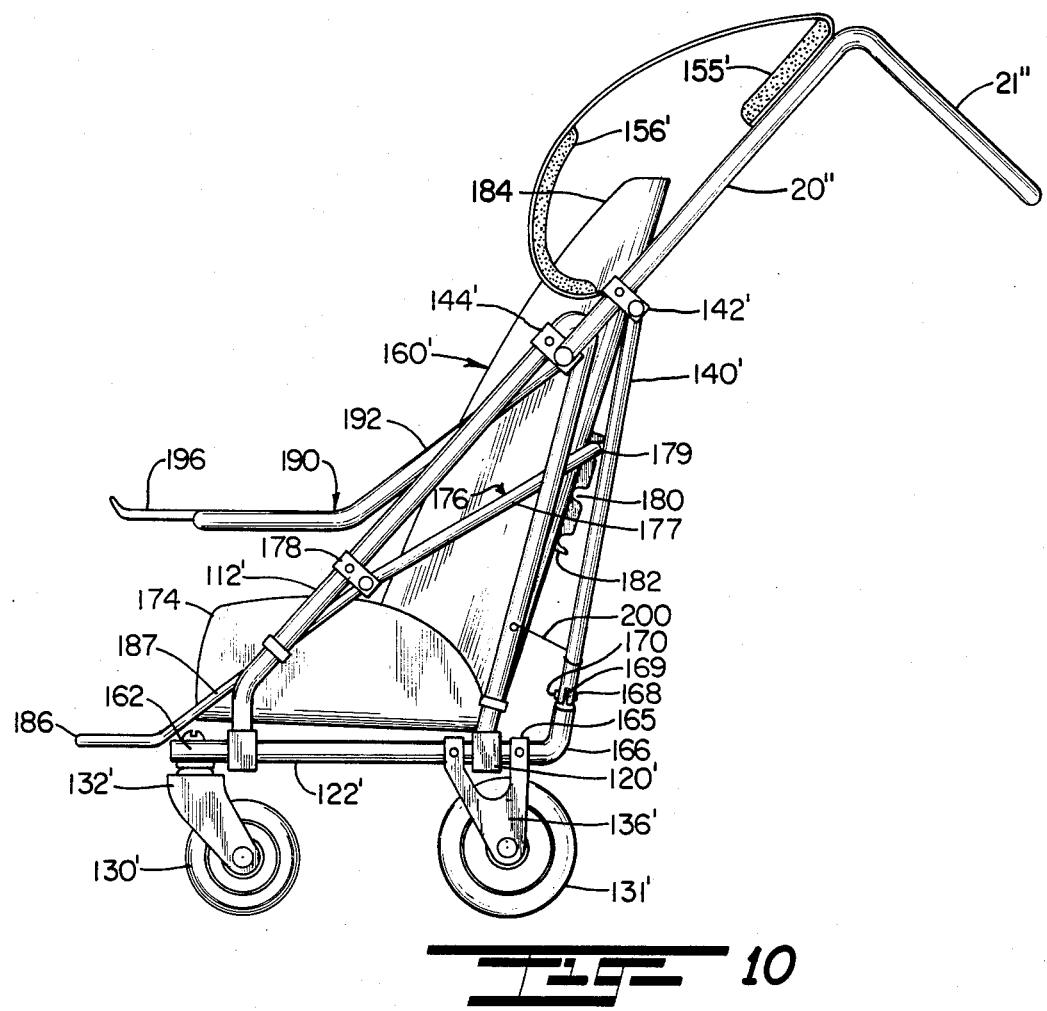
_FIG_ 10
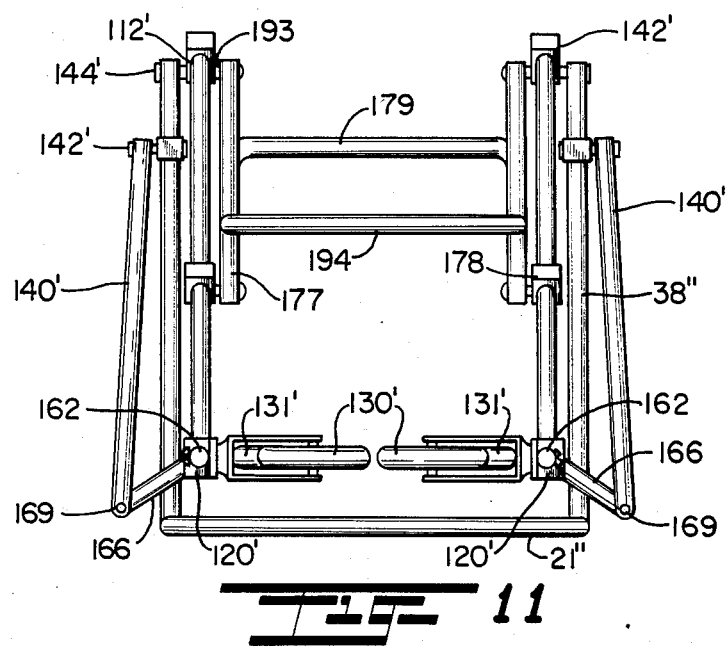
_FIG_ 11

4,620,711

MULTI-FUNCTION CHILD CARRIER

This invention relates to child carriers, and more particularly relates to a novel and improved child carrier or stroller which is convertible for use as a backpack or car seat carrier as well as being collapsible into a compact condition for storage.

BACKGROUND AND FIELD OF THE INVENTION

Innumerable types of baby carriages or strollers have been devised which are capable of use as a conveyance for one or more children. In addition, strollers both of the two-wheel and four-wheel variety have been devised which can be converted into car seat units. Representative of strollers of this type are those disclosed in U.S. Pat. Nos. 2,508,905 to M. Cohen, 2,805,076 to G. J. Thomas, and 2,291,640 to S. Lee. For instance, in Lee, the removable seat portion can be removed from the stroller frame and adapted for use as a car seat. In the patent to Thomas a child carrier is convertible between a stroller, car seat and other configurations. Similarly, in Cohen the carrier is convertible between a stroller and car seat unit wherein the wheels can be folded upwardly so as not to rest directly on the car seat.

It is proposed in accordance with the present invention to so construct and arrange the parts comprising the carrier as to be readily convertible between a stroller and car seat in a minimum number of steps without necessitating removal of the child from the carrier. Further, it is desirable to enable use of the device as a back pack carrier and to permit full collapsing for storage into a compact unit. In particular, when convertible into a car seat it is desirable that the handle member be movable into a position to serve as the base support and to maintain the wheels in a spaced position above the car seat or floor surface upon which the carrier rests whereby to prevent soiling or staining of the seat or other surface.

SUMMARY OF THE INVENTION

It is therefore an object of the present invention to provide for a novel and improved child carrier.

Another object of the present invention is to provide for a novel and improved four-wheel stroller which is convertible into a car seat without addition or removal of parts and without removing the infant from the carrier.

It is a further object of the present invention to provide for a novel and improved child carrier convertible into a car seat in such a way as to prevent the wheels of the carrier from contacting and soiling the seat of the vehicle onto which the carrier is placed.

It is an additional object of the present invention to provide for a novel and improved carrier which is convertible between a stroller and car seat and which is further capable of being disposed on a level surface to support the child in an upright position without additional means of support.

It is still a further object of the present invention to provide for a novel and improved carrier which is convertible into a stroller, car seat or backpack and which employs a minimum number of parts; yet will permit utilization of other standard child carrier accessories, such as, for example, foot rests, folding racks, food trays and the like and will permit adjustable disposition of a seat portion between upright and reclined positions.

In accordance with the present invention, a child carrier has been devised wherein a seat-mounting frame and a lower wheel frame assembly depend downwardly from the mounting frame, the wheel frame assembly including front and rear wheels supported for downward extension from the wheel frame assembly, and a seat portion is disposed on the seat mounting frame. A handle member has side frame portions extending from opposite sides of the seat-mounting frame, the side frame portions terminating in a hand-engaging, angled end portion extending rearwardly from the side frame portions, the handle member being pivoted to the seat mounting frame for pivotal movement of the handle member about a horizontal axis from a first position in which the handle extends rearwardly from the seat mounting frame when used as a stroller to a position in which the handle is directed downwardly from its pivotal connection to the seat mounting frame such that the angled end portion thereof is disposed beneath the wheels in order to support the carrier on a car seat when used as a car seat carrier. In a preferred embodiment, the wheels remain stationary and the handle member folds downwardly to a position beneath the wheel frame assembly and wheels, the folding movement controlled by a folding link assembly. In modified forms of the present invention, the front and rear wheels are pivotally connected to the wheel frame assembly and are responsive to downward folding movement of the handle to pivot from a downwardly extending position upwardly into a substantially horizontal extending position. In one modified form, the front and rear wheels pivot inwardly toward one another about axes parallel to the forward direction of travel of the carrier, and in another modified form, the front and rear wheels pivot about axes transverse to the forward direction of travel of the carrier. The disposition of the handle member in the downwardly extending or folded position is such that the carrier is adaptable for use as a backpack carrier through the utilization of shoulder straps and a hip support pad on the side frame members of the upper handle.

Other objects, advantages and features of the present invention will become more readily appreciated and understood when taken together with the following detailed description of a preferred embodiment in conjunction with the accompanying drawings, in which:

BRIEF DESCRIPTION OF THE DRAWINGS

FIG. 1 is a front perspective view illustrating a preferred embodiment of this invention;

FIG. 2 is a rear perspective view of the embodiment shown in FIG. 1;

FIG. 3 is a side elevational view of the preferred embodiment as shown in FIGS. 1 and 2;

FIG. 4 is an enlarged view in detail showing a folding link portion of the carrier of this invention;

FIG. 5 is a side elevational view illustrating conversion of the preferred embodiment from a stroller into a car seat carrier;

FIG. 6 is an enlarged view of a connector block employed in the preferred form of invention;

FIG. 6A is an enlarged view of another form of connector block employed as a part of the folding link assembly of the present invention;

FIG. 7 is a side elevational view of a modified form of child carrier in accordance with the present invention;

FIG. 8 is a front view showing the wheel assembly of the modified form of carrier in a collapsed position;

FIG. 9 is a side view of the modified form of carrier shown in FIGS. 7 and 8 in the collapsed position;

FIG. 10 is a side elevational view of still another modified form of child carrier in accordance with the present invention; and FIG. 11 is a front view of the modified form of carrrer shown in FIG. 10 with the wheels illustrated in a collapsed position.

DETAILED DESCRIPTION OF THE PREFERRED EMBODIMENT

Referring in detail to the drawings, there is illustrated in FIGS. 1 to 6 a preferred form of child carrier 10 which is convertible for use as a stroller or car seat. Further, it is conformable for use as a backpack carrier when in the semi-collapsed position as well as being adapted for use as a car seat, as illustrated in FIG. 5. In the semi-collapsed position, the carrier is free-standing and can be placed on a level surface to support the infant with or without additional means of support. To this end, in the preferred embodiment, child carrier 10 is broadly comprised of a seat mounting frame 12 for a seat portion 13 and a lower wheel assembly 14 including front and rear wheels 16 and 17, respectively, and a foot rest 18. An upper handle member 20 is pivotally or foldably connected to the juncture between the seat mounting frame 12 and wheel assembly 14 for swinging movement between a first position in which the handle member 20 extends somewhat rearwardly and upwardly from the seat mounting frame 12 when used as a stroller and a second position in which the handle member is folded downwardly from its pivotal connection to the seat mounting frame such that an angled end portion 21 of the handle member extends forwardly and is spaced beneath the wheels 16 and 17 so as to define a planar base support or platform for supporting the entire carrier on a car seat or level surface.

The wheel assembly 14 is comprised of front and rear leg members 24 and 25, respectively, extending downwardly from the rear end of the seat mounting frame 12 along opposite sides thereof, the front leg members 24 comprising a pair of straight tubular frame members inclining forwardly and downwardly from a common axis, defined by a shaft 26, for the rear leg members 25 and upper handle member 20. For this purpose, opposite ends of the front leg members 24 are provided with connector blocks 27, and as shown in FIG. 6 each block is in the form of a sleeve-like fitting having an axially extending bore 28 into which the end of the leg member is inserted and permanently attached by a suitable fastener as defined by a cross pin or rivet 28'. A transverse bore 29 is provided with an inner lining or bearing 30 to receive the shaft 26 for pivotal movement of the leg member about the shaft.

The rear leg members 25 form opposite sides of a common generally U-shaped frame, as viewed frontally, the opposite sides 25 merging into a common lower end portion 32. In the stroller position as illustrated in FIGS. 1 to 3, the legs 25 depend downwardly from upper connector blocks 27 pivotally connected to the shaft 26 with the rear legs inclined somewhat rearwardly and downwardly to terminate in the lower horizontal portion 32. Generally, therefore, the rear legs 25 in combination with the angled end portion 32 comprise a rear castor frame of generally L-shaped configuration when viewed from the side and include castors 34 mounted on opposite sides of the lower end 32 adjacent to its juncture with the lower end of the rear legs 25 and connected by a common bar 35 between the castors 34. Preferably, the rear wheels 17 are self-steerable and are mounted for suspension from the castors 34 in a conventional manner to afford maximum ease in steering or turning. Suitable straps or reinforcing wires 36 extend between the crossbar 35 and forward closed end of the lower end 32 to serve as a means of support for various items and accessories for the infant. In addition, as shown in FIG. 2, a flexible net N may be arranged to extend from the end portron 32 upwardly for connection to an intermediate portion of the front legs 24 to enlarge the capacity of the end portion 32 for storage purposes.

The handle member 20 is made up of opposite side members 38 which are merged and directed into a common angled end portion 21, the angled end portion 21 when in the raised position inclining downwardly and rearwardly from the upwardly and rearwardly inclined side frame members 38, the end portion 21 defining the hand-engaging portion of the handle when the carrier is used as a stroller. Lower ends of the side frame members 38 have pivotal connector blocks 27 interposed between the blocks 27 on the ends of the front legs 24 and rear legs 25. Preferably, the handle member 20 is maintained in the raised position as illustrated in FIGS. 1 to 3 by folding link assemblies 40 on opposite sides of the carrier including forwardly and upwardly inclining link members 41 and rearwardly and upwardly inclined link members 42, the link members 41 and 42 inclining upwardly from a common pivotal axis on the rear leg members 25 in spaced relation beneath the shaft 26. Opposite ends of the links 41 and 42 are correspondingly provided with pivotal blocks 44 which as illustrated in detail in FIG. 6A are of generally oblong configuration. Each block 44 has bifurcated ends 46 communicating with a common transverse bore 47, the latter provided with a bearing liner 48 and which is adapted to receive a tubular member of each of the front legs 24 and side frames 38 of the upper handle member. Each link 41 and 42 is preferably in the form of a metal strap which is secured to one side of each pivot block 44 by a suitable fastener in the form of a bolt 50 and tightening nut 51 on the opposite end, the bolt 50 passing transversely through aligned bores in the bifurcated end portions 46. Tightening of the nut 51 will cause the body of the block 44 surrounding the bore 47 to clampingly engage the frame member on either of the front leg or upper handle so as to effect a rigid mounting. A spacer or washer 50' is disposed on the bolt 50 to afford some limited play between the link and connected pivot block 44 so that the link is free to pivot about its pivotal mounting as the upper handle member is folded and unfolded. At the common axis of interconnection between the links 41 and 42, there is provided a pivot mount 54 which, as shown in FIG. 4, projects laterally away from an attached sleeve member 55 on each of the rear legs 25, and a pivot pin 56 is inserted through aligned openings at the adjoining ends of the links 41 and 42 and the mount 54. A generally U-shaped bracket 57 interconnects the pivot mounts 54 so that the sleeve members 55 are slidable in unison along the rear legs for advancement of each folding link assembly 40 between the position as illustrated in FIG. 1 and the collapsed position as illustrated in FIG. 5.

The seat mounting frame 12 is made up of a main frame loop 60 of tubular frame construction having opposite side members 61 pivotally connected at their rearward free ends by pivot blocks 27 to the main pivot axis 26, the side members extending horizontally in a forward direction from their pivotal connection about the pivotal axis 26 into a generally circular or closed end portion 62. In addition, a front support hoop 64 is similarly of a generally U-shaped tubular frame construction having opposite sides 65 extending downwardly from a common closed end portion 66 adjacent to the closed end 62 of the main frame loop. Opposite sides 65 similarly have connector blocks 27 at lower free ends which are pivotally connected to the pivot axis for the lower ends of the front legs 24 about a common axle 68 extending through the front wheels 16. A cross brace member 70 extends between opposite sides 65 of the hoop 64 at a point intermediately between the upper closed end 66 and lower ends, the brace, member 70 being permanently attached to the sides 65 by clamp-type connector blocks 27. A strap 76 extends downwardly and forwardly from connection to the brace 70 with its lower end interconnected at 77 to a lower closed end 78 of footrest 18. The footrest 18 has opposite sides 82 extending horizontally and rearwardly from the closed end 78 for connection by pivotal connectors 27 to the axle 68 just inwardly of the front wheels 16, the strap 76 serving to maintain the footrest in a predetermined angular relationship to the seat portion 13 in a manner to be described.

The seat portion 13 is of conventional construction and may suitably be made up of a foam plastic shell defining a lower horizontal seating portion 84 and upright portion 85 interconnected along a living hinge section 86. As best seen from FIG. 3, the seat portion is adjustable from a somewhat upright position shown in FIG. 1 to a reclined position by regulating the disposition of the upper closed end 66 of the hoop 64 with respect to a series of downwardly facing grooves 88 on a tray 90 which is positioned to rest upon the upper closed end 66 of the hoop. More specifically, the tray 90 is preferably of a flat, generally semicircular configuration, as shown in FIGS. 1 and 2, and has a downwardly directed connector block 91 at its rearward end which includes a transverse bore 92 to receive the forward closed end 62 of the main frame loop and bifurcated ends 93 which are adjustably clamped together by a fastener in the form of a bolt 94 and nut 95. The grooves 88 are formed at horizontally spaced intervals along a pair of reinforcing bars 96 on the underside of the tray 90, and the upper closed end 66 of the hoop 64 is releasably held in place within one set of the grooves 88 by a strap member 98 which extends forwardly from a hinge section 100 on the side of the connector block 91 and beneath the bars 96, the forward end of the plate being releasably latched to the undersurface of the tray by a latch member 102.

The underside of the horizontal seat portion 84 is attached by suitable means, such as, a metal strap 70' to the cross brace 70 so as to follow the forward and rearward movement of the front hoop portion 64 with respect to the grooves or notches 88 in adjusting the degree of inclination of the upright portion 85 of the seat. To this end, the latch 102 can be released away from the grooved bars 96 to swing the frame member 12 and tray 90 upwardly about the pivot point 26 and clear the upper closed end 66 sufficiently to permit the closed end 66 to be advanced either in a forward or rearward direction into alignment with another set of grooves 88. Once positioned in another set of grooves, the strap 99 is reattached by means of the latch 102. It will be noted that the footrest 80 will follow movement of the hoop 64 in adjusting the seat portion 13 so as to maintain a fixed distance between the footrest 80 and seat 13.

In the construction of the preferred embodiment as described, it will be appreciated that the main frame components are of generally U-shaped tubular frame construction so as to obviate specially cast, metal or plastic parts and minimize investment in production tooling as well as to minimize the concentration of stresses and avoid frame failures due to overstressed components. The main frame components can be readily assembled using the two basic type of connector blocks 27 and 44, although it will be evident that other types of standard connectors can be employed. In order to fold the carrier from the stroller position as shown in FIGS. 1 to 3 to the car seat or collapsed position shown in FIG. 5, it is necessary merely to release the folding link assemblies 40 and pivot the handle 20 downwardly about its connection to the axis 26 until it is advanced into a position beneath the wheels. For this purpose, spring-loaded detents 104 are positioned beneath each of the sleeves 55 to normally retain the folding link assemblies 40 in the raised position. In the folded position, the wheels are spaced above the lower end of the handle to avoid bearing upon and soiling of the seat of the car or airplane. The handle also provides a firm base for the entire carrier in the car seat position and facilitates ease of strapping in the child by means of the standard seat belts furnished in the automobile or airplane as generally designated at A in FIG. 5.

It will be evident that when the carrier is not in use it can be fully collapsed into a self-contained package which is extremely compact by the simple expedient of collapsing the handle 20 downwardly into the car seat position and swinging the foot rest 18 upwardly and rearwardly. Concurrently, hoop 64 is disengaged from grooves 88 and moved rearwardly, thereby allowing the frame member 12 and affixed tray 90 to drop downwardly and rearwardly to allow the closed end 78 of footrest 18 to engage the grooves 88. On the other hand, when in use the chair can be readily converted between a car seat and stroller position without removing the child in a one-step operation which requires merely the folding of the handle 20 in either direction as described. When folded beneath the wheels, it is desirable to employ a suitable form of latch or catch to maintain a fixed relationship between the handle 20 and rear castor frame 14. The construction of the rear castor frame and handle further lends the carrier well to utilization of various types of storage areas associated with the rear castor frame in addition to that illustrated and described in FIGS. 1 to 3 thereby to permit the operator to carry various loose items without the need of additional sacks. It will be evident that a canopy may be employed to extend from the handle portion over the seat portion and that straps and pads in appropriate locations will permit the carrier to be used as a backpack in a manner to be hereinafter described rn more detail.

DESCRIPTION OF MODIFIED FORMS OF INVENTION

In the modified form of invention shown in FIGS. 7 to 9, the construction of carrier 110 follows the same principle as in the preferred embodiment of employing a folding handle 20' to serve as a support or base member which can be folded beneath the wheel assembly to convert the carrier from a stroller to a car seat or backpack carrier as illustrated in FIG. 9. The carrier construction is somewhat more compact in that the lower wheel assembly to be described is pivotal upwardly within the wheel frame when the hahdle is folded beneath the frame so that the handle can rest directly beneath the frame with the wheels raised within the frame and therefore permits the use of a somewhat shorter handle member 20'. Moreover, the wheel frame and seat frame assemblies are integrated somewhat more and permit seat portion 111 to rest more directly on a wheel frame assembly. Overall, the carrier has a much lower profile and is extremely compact so as to lend itself well for use as a backpack carrier.

Referring in more detail to the drawings, a pair of main frame members 112 are of inverted generally V-shaped configuration to define front and rear legs 113 and 114, respectively, diverging downwardly and away from an upper apex or closed end 116 of each of the main frame members 112. Each front leg inclines more gradually in a vertical direction away from the closed end 116 than a respective rear leg 114, each front leg terminating in a lower bent vertical end 118 to which is affixed a connector block 120. Correspondingly, each rear leg 114 is affixed to a connector block 120 with a straight connecting bar 122 interconnecting the blocks 120 of each of the main frame members 112 so as to result in a generally triangular main frame member 112. The main frame members are interconnected by axles or shafts 124 and 125 which extend between the connector blocks 120 at the lower terminal ends of the front and rear leg members, respectively.

In the modified form, each of the front and rear connector blocks 120 is generally square and has two counterbores, not shown, at right angles to one another for insertion of one of the legs and the bar 122, and a transverse through bore 128 is arranged mutually perpendicular to the counterbores for connection of the axles 124 and 125. The ends of the axles may be upset or fitted with end caps to retain the connector blocks thereon; or, in the alternative, suitable rivets or pins may be inserted through the block and into the ends of the axles to affix them to the connector blocks 120.

In order to pivotally mount the front and rear wheels 130 and 131 onto the main frame, each of the front wheels 130 is journaled to a conventional swivel mount or castor 132 which depends downwardly from a pivot arm 133, the latter being pivotal at its approximate midpoint about the axle 124 and inclining rearwardly and upwardly for connection to a pivot link 134 above the axle 124. The rear wheels 131 are independently journaled between a pair of suspension brackets 136 which extend downwardly from pivotal connection to the rear axle 125, and the pivot links 134 incline rearwardly and downwardly from their connections to the arms 133 for pivotal connection at 137 to an intermediate point on the brackets 136. Each pair of brackets 136 is of generally triangular configuration and its uppermost end 138 is pivotally connected to a pivot link 140 which extends downwardly from its connection to a pivotal connector block 142. Block 142 has bifurcated ends into which the upper end of the pivot link 140 is inserted and pivotally interconnected by a pivot pin 143 extending through aligned openings of the end members 144, as shown in FIG. 8.

Each handle 20' corresponds generally in construction to the handle member 20 of the preferred embodiment, except that it is of a shorter length for the reasons indicated but is again made up of side frame members 38' terminating in an upper angled end portion 21'. Each side frame member 38' is connected at its lower extremity to a pivotal connector block 144 which is securely affixed as shown to the upper closed end 116 of each of the main frame members 112. As best seen from FIG. 8, each block 144 has a bifurcated end 145 which receives the upper closed end of the main frame 112, and a pivot pin 146 is inserted through aligned openings in the bifurcated ends 146, closed end 116 and lower extremity of side frame member 38' to complete the pivotal connection therebetween. The handle member 20' is normally retained in the stroller position, as shown in FIG. 7, by a latch 150 which extends rearwardly from connection to the rear leg 114 of one of the main frame members 112 and terminates in a hook end 152 which releasably engages a catch, not shown, on the upper pivotal ends 138 of the suspension brackets 136. In order to collapse or fold the carrier into the car seat position, the latch 150 must be manually released to permit the handle 20' to be folded downwardly about its pivot 144 until it advances into the collapsed vertical position. As the handle portion is folded downwardly to a position beneath the wheel assembly, the pivot links 140 cause the rear suspension brackets 136 to pivot upwardly about the axle 125 and, through the pivot link 134, cause the front wheels 130 to pivot upwardly about the front axle 124 until the wheels assume the position illustrated in FIGS. 8 and 9 with the front wheels 130 disposed within or between the rear wheels 131. For purposes of clarity, seat portion 111 is not illustrated in FIGS. 8 and 9. However, the seat portion 111 may correspond to that illustrated and described in the preferred embodiment and is suitably attached by straps or rivets, not shown, to the main frame. Although not shown, other suitable accessories may be added, such as, a foot rest and storage pack.

In order to facilitate use of the modified form of invention shown in FIGS. 7 to 9 as a backpack carrier for an infant, a hip support pad 155 is affixed to the upper surfaces of the side frame members 38' by suitable means, such as, screw-type fasteners or bolts between the support pad and frame surfaces. When the handle is folded beneath the wheel frame assembly as shown in FIG. 9, the hip support pad is located to bear against the waist and hip region of the wearer. A pair of shoulder straps 156 are secured to the side frame members 38' for extension between the pivot blocks 142 and the lower edge of the hip support pad 155. The shoulder straps may be foam padded or otherwise constructed in accordance with conventional practice to assure maximum comfort for the wearer. In the collapsed position, a protuberance or other suitable form of catch 158 is provided on the inside of pad 155 for engagement by the latches 150 to prevent shifting or relative movement between the main frame and handle portion.

In the modified form of invention shown in FIGS. 10 and 11, the carrier 160 is comprised of a main frame 112" corresponding to that of the main frame 112 of the first modified form and accordingly like parts are correspondingly enumerated with prime numbers. Moreover, the handle portion 20" corresponds to that of the handle 20' of the first modified form including the hip support pad 155, shoulder pads 156 and a connection of pivot link 140' to upper pivotal connector 142'. As a departure from the first modified form of invention of FIGS. 7 to 9, the front and rear wheels 130' and 131' are mounted for pivotal movement about a lower connecting bar 122' which extends through connector blocks 120'. Castor 132' for each of the front wheels 130' is connected in swiveled relation to a forward continuation or extension 162 of the connecting bar 122'. In turn, rear suspension brackets 136' have upper divided ends which terminate in sleeves 164 and 165 positively connected to the connecting bar 122' and rearward extension 166 on opposite sides of the rear connector block 120'. It will be noted that the rearward extension 166 continues beyond the rear connector block 120 and curves upwardly into an upwardly and rearwardly inclined portion which terminates in a flange or male end 168 adapted for insertion between bifurcated ends 169 at the lower extremity of the pivot link 140'. The male end 168 is insertable between the bifurcated ends and a pivot pin 170 extends transversely through aligned openings in the complementary ends 168 and 169 to define a knuckle joint and effect a pivotal connection between the extension 167 and pivot link 140'. The relative lengths of extension 167 and pivot link 140' are such that when the upper handle 20'' is in the raised position as shown in FIG. 10 the pivot link 140' and extension 167 form a slight angle at the knuckle joint so that the pivot link 140 will cause the connector bar to rotate about its axis in response to downward urging of the pivot link until the wheels 130' and 131' have been rotated into a horizontal position substantially flush or within the plane of the connecting bars 122'. Accordingly, as the handle member 20' is folded downwardly about its pivot 144', the wheels are folded upwardly and inwardly into the space between the lower connecting bars 122' of the main frame 112', as best seen from the collapsed position of FIG. 11. In this relation, the angled en portion 21'' of the handle member will advance into a position beneath the wheels and effectively serve as a base support for use as a car seat. In this collapsed position, it is adaptable for use as a backpack carrier in the same manner as described with respect to the first modified form.

As illustrated in FIG. 10, a seat portion 174 is adjustably positioned between the main frames 112' by means of a recliner frame 176, the recliner frame being of generally U-shaped configuration having opposite sides 177 connected at the lower free ends to a connector block 178 and an upper closed end 179 insertable into one of a series of grooves 180 which are formed in rearwardly directed relation in a plate 182 affixed to the back or upright portion 184 of the seat 174. Connector blocks 178 are attached to the front leg members of the main frame with the recliner portion pivotally connected to the blocks so that as recliner frame 176 is pivoted downwardly it will permit back 184 to be lowered or reclined rearwardly between the main frame members. A foot rest 186 is similarly in the form of a generally U-shaped frame having opposite side members 187 terminating in upper free ends which are pivotally connected to the blocks 178 preferably by inserting the upper ends into the lower tubular ends of the sides 176 of the recliner frame. In this way, the lower foot rest portion will follow the movement of the recliner frame and cause the lower foot rest 186 to be raised as the upper end of the recliner frame is lowered.

The seat portion 174 is suitably mounted with respect to the frame by means of retainer straps as indicated at 188 which interconnect opposite sides of the seat portion with the front and rear legs of the main frame, the seat portion being constructed in a manner corresponding to that of FIG. 1 wherein the upright portion is connected by a living hinge to the horizontal portion so that the upright portion is free to move independently of the horizontal portion in following movement of the recliner assembly. A retainer bar 190 is of generally U-shaped confrguration having opposite sides 192 inclining downwardly and forwardly from pivotal connection as at 193 to insides of the pivotal connector block 144'. A lower generally horizontally extending portion 194 terminates in a closed end which is spaced above the forward edge of the seat portion and serves as a restraint member when the child is positioned in the carrier. In addition, the closed end 194 can serve as a suitable means of support for a tray 196 which is clipped onto the closed end 194 for forward extension therefrom to form a suitable support for food or playthings. Although not shown, various forms of pouches or receptacles for accessories can be affixed to the rear surface of the upright portion of the seat. Preferably, such receptacles are made of a flexible material which will collapse inwardly against the seat when the handle is folded downwardly into the collapsed position.

Releasable latch members 200 are mounted on the rear legs of the main frame 112'' and extend rearwardly for engagement with the pivot links 140 in a manner very much similar to the latch members 150 of the modified form of FIGS. 7 to 9. However, the latch members will engage the pivot links 140' to prevent outward swinging movement of the pivot links until it is desired to fold the handle 20' into the collapsed position as described. Alternately, a restraining bar, not shown, may be connected between the pivot links 140' to prevent outward swinging or pivotal movement. Similarly, suitable forms of stops are positioned at the points of pivotal connection between the bar 190 and the connector blocks 144' to limit downward swinging movement of the bar into the attitude or disposition as illustrated in FIG. 10. This bar may be swung upwardly and rearwardly to facilitate removal or placement of the child into the carrier. The front tray portion 196 on the bar is not illustrated in FIG. 11; nor is the foot rest portion 186 in the interest of more clearly illustrating the frame construction and relationship between parts in the collapsed position.

The preferred and modified forms of carriers as described possess a number of desirable characteristics in common, but most particularly the ability to permit ease of conversion between a stroller and car seat mode, it being understood that the car seat mode is equally useful for use as a backpack carrier in the manner illustrated in FIGS. 7 to 11. By virtue of the folding action of the handle member, the child can remain in the carrier as the handle is folded rearwardly either from the stroller mode to the car seat mode or vice versa; and in the car seat mode, each form will effectively prevent the wheels of the stroller from contacting and soiling the seat of the vehicle onto which the carrier is placed. Various additional accessories can be employed, such as, folding racks or trays to permit the operator to transport accessory materials for the child or for other items, such as, groceries.

It is therefore to be understood that while preferred and modified embodiments of the present invention are herein illustrated and described, various other modifications and changes may be made therein without departing from the spirit and scope of the present invention as defined by the appended claims.

I claim:

1. In a child carrier having a seat-mounting frame and a lower wheel frame assembly depending downwardly from said seat mounting frame, said wheel frame assembly including front and rear wheels supported for downward extension from said wheel frame assembly, and a seat portion disposed on said seat-mounting frame, the improvement comprising:

a handle member normally extending rearwardly of said seat-mounting frame, said handle member terminating in a hand-engaging, angled end portion; and pivot means pivotally interconnecting said handle member to said seat-mounting frame for pivotal movement of said handle member about a horizontal axis from a first position in which said handle member extends rearwardly of said seat-mounting frame when in a raised position as a stroller to a lowered position in which said handle member is directed downwardly with said angled end portion extending forwardly in spaced relation beneath said wheels to support said carrier on a car seat with said wheels spaced above the car seat.

2. In a child carrier according to claim 1, said angled end portion directed horizontally in spaced relation beneath said wheels when in the lowered position to define a planar base support platform.

3. In a child carrier according to claim 1, said handle member constructed of a tubular frame with said side frame portions angled upwardly then rearwardly and joined by a common frame member at the terminal end of said angled end portion.

4. In a child carrier according to claim 3, said handle member in profile being of generally L-shaped configuration.

5. In a child carrier according to claim 1, said wheels frame assembly having rear legs and front legs, a first folding link member between each of said side frame portions and one of said rear legs, means normally retaining said folding link members in a position locking said handle member in a first raised position, and means for releasing said folding link for downward swinging movement of said handle member into a position in which said angled end portion underlies said wheels.

6. In a child carrier according to claim 5, said seat mounting frame including a generally horizontally extending side frame and a vertically extending front frame, said front frame connected at its lower end to said front leg members.

7. In a child carrier according to claim 1, said front and rear wheels being pivotally connected to said wheel frame assembly, and wheel release means responsive to downward folding movement of said upper handle member to cause said wheels to pivot from a downwardly extending position to a horizontally extending position.

8. In a child carrier according to claim 7, said wheel release means urging said front and rear wheels to pivot inwardly toward one another about axes parallel to the forward direction of travel of said carrier.

9. In a child carrier according to claim 7, said wheel release means operative to cause said front and rear wheels to pivot about axes transverse to the forward direction of travel of said child carrier.

10. A child carrier comprising:

a wheel frame assembly of triangular configuration including front and rear wheels supported for downward extension from said wheel frame assembly, and a seat portion disposed thereon, said front and rear wheels pivotally connected to said wheel frame assembly;

an upper handle member having side frame portions extending upwardly from opposite sides of said wheel frame assembly, said side frame portions including an angled portion extending rearwardly from said side frame portions when said handle member is in a raised position;

pivot means pivotally interconnecting said handle member to said wheel frame assembly for pivotal movement of said side frame portions about a horizontal axis from a first raised position in which said side frame portions extend upwardly from said wheel frame assembly when used as a stroller to a lowered position in which said angled portion extends forwardly in spaced relation beneath said wheels to define a planar base support; and wheel release means responsive to pivotal movement of said side frame portions to cause said wheels to pivot from a downwardly extending position to a horizontally extending position.

11. A child carrier according to claim 10, said side frame portions of said upper handle member angled upwardly and rearwardly and said angled end portion directed downwardly and rearwardly when in the raised position.

12. A child carrier according to claim 11, said angled end portion directed horizontally beneath said wheels when in the lowered position.

13. A child carrier according to claim 12, said upper handle member constructed of a tubular frame with said side frame portions angled upwardly then rearwardly and joined by a common frame member at the terminal end of said angled end portion.

14. A child carrier according to claim 13, said upper handle member in profile being of generally L-shaped configuration.

15. In a child carrier according to claim 10, a link member between each of said side frame portions and one of said legs including a pivot means for folding each of said link member, means normally retaining said folding link members in a position locking said upper handle member in the first raised position, and means for releasing said folding link members for downward swinging movement of said upper handle member into a position in which said angled end portion underlies said wheel.

16. In a child carrier according to claim 15, a seat mounting frame including a generally horizontally extending side frame and a vertically extending front frame, said front frame connected at its lower end to said front leg members.

17. A child carrier assembly comprising in combination:

a plurality of generally U-shaped frame members interconnected to define a seat-mounting frame, front and rear leg members depending downwardly from opposite sides of said seat mounting frame, and an upper generally L-shaped handle member extending upwardly and rearwardly from opposite sides of said seat-mounting frame in which said closed end of said upper handle is an angled end portion extending rearwardly and downwardly from upper ends of opposite sides of said upper handle;

front and rear wheels journaled in spaced relation to one another on said front and rear leg members respectively; and pivot means pivotally connecting opposite sides of said upper handle member at its lower end to said seat mounting frame for pivotal movement of said upper handle member from a raised position extending upwardly when used as a stroller to a lowered position in which said angled end portion is disposed in spaced relation beneath said wheels whereby to support said child carrier on a car seat when used as a car seat carrier.

18. A child carrier according to claim 17, said front and rear wheels pivotally connected to said wheel frame assembly, and wheel release means responsive to downward folding movement of said upper handle member to cause said wheels to pivot from a downwardly extending position to a horizontally extending position.

19. A child carrier according to claim 17, said wheel release means urging said front and rear wheels to pivot inwardly toward one another about axes parallel to the forward direction of travel of said carrier.

20. A child carrier according to claim 17, said wheel release means operative to cause said front and rear wheels to pivot about axes transverse to the forward direction of travel of said child carrier.

* * * * *